US006487183B1

(12) United States Patent
Lo et al.

(10) Patent No.: US 6,487,183 B1
(45) Date of Patent: Nov. 26, 2002

(54) ACTIVITY BASED RESOURCE ASSIGNMENT MEDIUM ACCESS CONTROL PROTOCOL

(75) Inventors: Wing F. Lo, Plano, TX (US); Jeff L. Watson, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/228,607

(22) Filed: Dec. 21, 2001

(51) Int. Cl.[7] .......................... H04B 7/212; H04Q 7/20
(52) U.S. Cl. ................... 370/326; 370/347; 370/437; 370/442; 455/450; 455/453; 455/525
(58) Field of Search .................... 370/238, 341, 370/431–433, 437, 441, 442, 450, 454, 459, 310, 321; 455/450, 453, 456, 509, 514, 520, 525

(56) References Cited

U.S. PATENT DOCUMENTS

| 5,123,110 A | * | 6/1992 | Grube .................... 455/525 |
| 5,161,154 A | * | 11/1992 | Diaz et al. ................ 370/341 |
| 5,299,199 A | * | 3/1994 | Wilson et al. ............. 370/347 |
| 5,371,780 A | * | 12/1994 | Amitay ..................... 455/450 |
| 5,689,568 A | * | 11/1997 | Laborde .................... 370/314 |
| 5,862,485 A | * | 1/1999 | Linneweh, Jr. et al. ..... 455/450 |
| 6,052,594 A | * | 4/2000 | Chuang et al. ............. 455/450 |
| 6,163,697 A | * | 12/2000 | Peterson et al. ........... 455/450 |

OTHER PUBLICATIONS

Kim et al., "Connection Admission Control for PRMA/DA Wireless Access Protocol", pp. 478–482, IEEEE 1997.*
Frullone et al., "PRMA Performance in Cellular Environments With Self-Adaptive Channel Allocation Strategies" pp. 657–664, IEEE 1996.*

* cited by examiner

*Primary Examiner*—Alpus H. Hsu
*Assistant Examiner*—Afsar M. Qureshi
(74) *Attorney, Agent, or Firm*—John D. Crane; Bracewell & Patterson, L.L.P.

(57) ABSTRACT

A method for implementing an activity based resource assignment medium access control (MAC) protocol to allocate resources to subscribers in an interactive, multimedia, broadband satellite communications system. A plurality of channels is provided with at least one of said plurality of channels being assigned to each of a plurality of terminals. Utilization of the channel resources by the plurality of terminals is monitored and an evaluation is conducted of system needs based on the levels of activity and utilization of channel resources by the terminals. Requests for system resources by the terminals are communicated to a resource controller which calculates the system needs. The resource controller is utilized to adjust the channel resources based on the levels of activity and utilization of resources by the terminals. The adjustment provides active terminals as much resources as required during duration of their activity, subject to resource availability.

27 Claims, 5 Drawing Sheets

ACTIVITY BASED RESOURCE ASSIGNMENT MEDIUM ACCESS CONTROL PROTOCOL

BACKGROUND OF THE INVENTION

1. Technical Field

The present invention relates generally to an improved communications system and more specifically to an improved satellite communications system. Still more particularly, the present invention relates to a method and system of assigning communication channel resources of an interactive multimedia satellite communications system to increase throughput efficiency while maintaining low access delays.

2. Description of the Related Art

Factors driving the need for broadband communications arise from changing user needs and demands. The International Telecommunications Union (ITU, formerly known as CCITT) defines broadband service as a service requiring transmission channels capable of supporting rates greater than 1.5 Mbps or a primary rate in ISDN or T1 or DS1 in digital terminology. A broadband integrated services digital network (BISDN) technology framework involves asynchronous transfer mode (ATM) as a protocol for coordinating information between source and destination nodes. Previously, public network needs were driven by telephoning, voice data. Data traffic has grown slowly until recently. With the lower cost in telecommunications and the higher increase in processing power of computers, the numbers of users accessing communications networks has increased. The needs of these users include, for example, video telephone, low cost video conferencing, imaging, high definition television (HDTV), and other applications requiring multimedia data transfers. Multimedia combines different forms of media in the communication of information between a user and a data processing system, such as a personal computer. A multimedia application is an application that uses different forms of communications within a single application. Multimedia applications may, for example, communicate data to a user on a computer via audio, text, and video simultaneously. Such multimedia applications are usually bit intensive, real time, and very demanding on communications networks.

Satellite communication systems are generally known to facilitate communication with user terminals across most areas of the Earth. In a satellite communication system, at least one satellite operates from an orbit above the earth. International telecommunication satellites typically operate from a geostationary orbit (GEO) that is approximately 36,000 kilometers above the surface of the earth.

Satellite communications, in particular GEO orbit satellites communications, are subject to long access delay. Contention access methods which can serve a large number of low duty cycle terminals well in low delay terrestrial radio environment do not perform efficiently in satellite systems.

Traditional very Small Aperture Terminal (VSAT) systems are designed to handle smaller numbers (a hundred or less) of terminals of relatively higher duty cycle. These VSAT systems often utilize a reservation based system, wherein a small amount of bandwidth is dedicated to each terminal for communicating a terminal's request to the gateway or hub. However, such reservation based system tends to be inefficient when a large number of low duty cycle terminals are sharing a pool of transmission channels.

Two specific examples of current contention access protocols are ALOHA and Reservation based. An ALOHA contention protocol will give very poor delay and throughput performance when utilized for a system with a large, active terminal population. In a system utilizing an ALOHA contention protocol, every terminal at every instant has the right to transit over the channel. There will be collisions, and the colliding packets will be destroyed. When this happens, each terminal waits a random period and then resends its packet. This provides low delay with minimal control overhead when the system is very lightly loaded or has relatively few active terminals. As the loading increases, so does the number of colliding packets, and thus the average delay associated with each packet. Further, the efficiency drops as more of the channel is wasted by colliding packets. The maximum throughput in an ALOHA system is limited to about 36% of the system capacity. As the load offered by the terminals approaches and passes this limit, the system throughput drops and the delay performance deteriorates rapidly.

There are many performance limitations of the circuit switched and burst-by-burst media access control (MAC) protocols. Circuit switched protocols assign fixed bandwidth to each active terminals. This works very well for relatively constant rate terminals where the channel size can be matched to the terminal transmission needs. However, for large populations of bursty multimedia users, circuits sized to the average terminal transmission need will give very poor delay performance, and circuits sized to give good delay performance to handle the terminal bursts will result in very poor system utilization.

Considering circuit switched performance for a simple example wherein 100,000 subscribers share 100 time division multiple access (TDMA) channels, and wherein the multimedia traffic offered by the user to the terminal is a block of data equivalent to 1 second of the TDMA channel every 100 seconds. This gives the average offered load of 1%. With 50 simultaneous sessions, the average assignment to each user is at most 2% of the TDMA channel. The delay performance is poor in that a terminal with this assignment would require 50 seconds to transmit each block of data. The channel utilization is 50% in this case. The delay performance could be improved by raising the connection rate. However, a higher connection rate reduces the number of subscribers that each channel would be able to support. The higher connection rate will also result in poorer utilization of the TDMA channel as each connection sits idle between bursts.

Burst-by-burst MAC protocols have the potential to provide better delay and channel utilization performance, but at the cost of significantly higher signaling overhead. In the burst-by-burst protocol, the subscriber makes a request for a specific number of TDMA slots and after receiving an allocation, transmits only in those slots. There is an intrinsic 0.5 second double hop delay in this approach. In addition, it requires significantly greater signaling overhead associated with the resource requests and allocations. Still greater delays may occur if the reservation request channel operates with a contention protocol with-the result that simultaneous requests collide and must be resent. With this MAC approach, it is possible for the signaling overhead to swamp the traffic data. The burst-by-burst MAC protocol would perform very well for traffic with characteristics described above. However for the case where the same quantity of traffic arrives as a constant stream of bursts, the signaling overhead inefficiency becomes apparent.

Assume that the traffic arrives in blocks of data equivalent to 0.01 second of the TDMA channel every second. The terminal needs to make a request and receive a burst assignment for each of these blocks. The request/assignment exchange introduces a delay of at least 0.5 second. Further, there is a delay waiting for the allocated slot time. Also, the high signaling requirement can result in a low overall efficiency.

Interactive multimedia traffic is characterized by intermittent bursts at very high rate surrounded by periods of inactivity and a resulting low average rate. A switched circuit connection approach performs poorly for multimedia traffic. With circuit switching, a terminal must establish and maintain a connection for the duration of its session. If the circuit rate is near the average data rate, the link can have extremely poor delay performance. If it is set near the burst rate, the link will be very inefficient. In the first case, the subscriber is likely to be dissatisfied with the performance. In the latter case, the subscriber is likely to be dissatisfied with his usage charges.

Terrestrial wireless broadband networks have been studied extensively in recent years and many MAC protocols have been put forward. A key difference between terrestrial systems and satellite systems for this application is the difference in access delay. Whereas the MAC protocols for terrestrial systems can rely on the nearly instantaneous responses to user resource requests, the request/response access delay in a geosynchronous satellite system with ground based resource scheduling is one-half second.

It would therefore be desirable to have a MAC protocol tailored for a satellite environment. It would further be advantageous to have such a MAC protocol which can efficiently handle bursty traffic such as multimedia traffic. Further, it would be desirable to have a multimedia MAC protocol which provides high resource efficiency and provides low access delay.

SUMMARY OF THE INVENTION

It is therefore one object of the present invention to provide an improved communications system.

It is another object of the present invention to provide an improved satellite communications system.

It is yet another object of the present invention to provide a method and system of assigning communication channel resources of an interactive multimedia satellite communication system to increase throughput efficiency while maintaining low access delays.

The foregoing objects are achieved as is now described. A method is disclosed for implementing an activity based resource assignment medium access protocol to allocate resources to subscribers in an interactive, multimedia, broadband satellite communications system. The method first provides a plurality of channels with at least one of said plurality of channels being assigned to each of a plurality of terminals. The method then monitors the utilization of the channel resources by the plurality of terminals. An evaluation is conducted of system needs based on the levels of activity and utilization of channel resources by the terminals. Requests for system resources by the terminals are communicated to a resource controller which calculates the system needs. Finally, the method utilizes the resource controller to adjust the channel resources based on the levels of activity and utilization of resources by the terminals.

In the preferred embodiment, the adjustment provides active terminals as much resources as required during duration of their activity, subject to resource availability. Additionally, the MAC protocol implemented is a multimedia circuit switched MAC protocol tailored to a geostationary satellite communications system environment.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The invention is a resource assignment MAC layer protocol for broadband interactive satellite communications system. The preferred embodiment of the invention is specifically designed for a geostationary satellite system. The invention provides a new and efficient resource assignment scheme that enables a large number of low duty cycle interactive satellite terminals to share a pool of satellite transmission resources efficiently. By exploiting the traffic characteristic of individual interactive satellite terminal users which typically consists of burst of high activities followed by longer periods of no activities the invention improves overall efficiency of the system while maintaining low access and reduced traffic delays.

Figure 1:
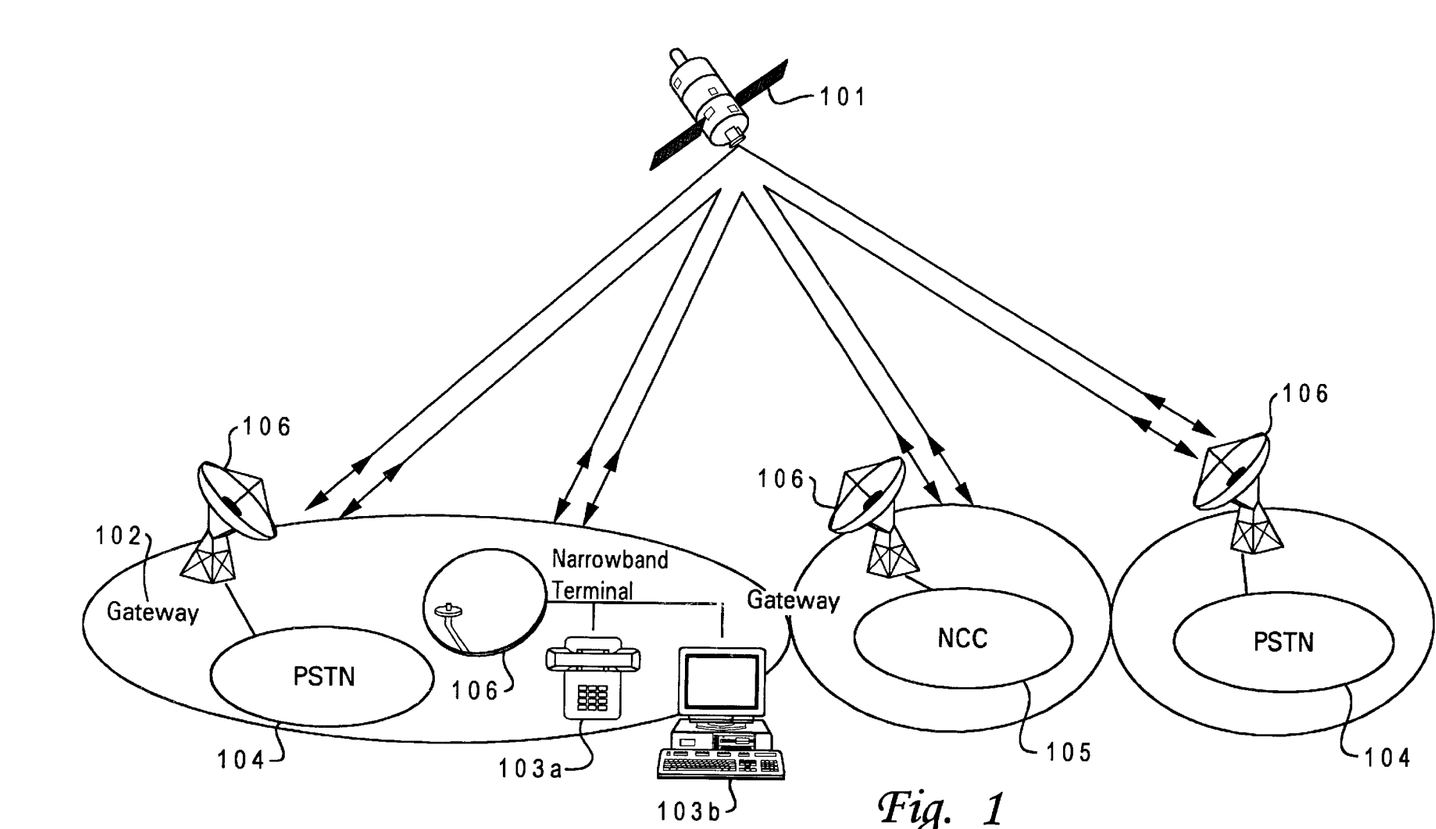
FIG. 1 is a diagram of a general satellite system utilized in one embodiment of the present invention.

With reference now to the figures and in particular with reference to FIG. 1, there is depicted a satellite communication system in which the present invention may be implemented including a satellite 101 orbiting above the Earth's surface. The satellite communications system includes gateways 102 nd user terminals 103 which communicate with satellite 101. The components in combination therefore route communications between gateways 102 and between user terminals such as telephones 103a and computers 103b via satellite dish receptors 106 and gateways 102 via a public switched telephone network (PSTN) 104. In operation, satellite 101 serves to relay these communications and is controlled by a network control center (NCC) 105. User terminals 103 depicted are narrowband terminals which transmit at low data rates. This architecture is well-suited for connection-oriented communications with constant rates. A relatively short setup period is followed by a long billable communications period. This results in highly efficient utilization of the communication resources.

In the preferred embodiment of the invention, satellite 101 is a geostationary satellite in orbit. Geostationary satellites are well known by those skilled in the art. A geostationary satellite is one that (a) is located at a point on a geostationary orbit and (b) remains directly above a fixed point on the equator at a geostationary height. Geostationary satellite height is the height above the surface of a rotating celestial body, such as the Earth, at which acceleration due to the force of the gravity is exactly matched by a satellite having velocity such that it matches the rate of rotation of the celestial body.

An earth terminal, in a satellite link, is one of the non-orbiting communications stations that (a) is on the Earth's surface or within a major portion of the Earth's atmosphere, and (b) receives, processes, and transmits signals between itself and a satellite. A satellite link is a wireless link that (a) is between a transmitting earth station and a receiving earth station via one satellite, (b) may be a link in an earth surface communications system, and (c) usually consists of one uplink, one downlink, and a satellite station, such as a satellite relay.

In the preferred embodiment, most of the processing (establishing links and sending and receiving signals, etc.) required to implement the MAC protocol is instantiated as a software algorithm within a data processing system located within or connected to the overall system.

The processes of-the present invention may be implemented in a data processing system, such as a resource controller within the NCC. The present invention also may be implemented in other data processing systems. For example, the processes of the present invention may be implemented within a computer having a connection to a gateway in which the computer provides the logic and commands to the gateway to provide the processes utilized. Agents at the terminals or the hub where resource assignments are received and resource coordination takes place respectively are such data processing systems. In the preferred embodiment, a resource controller provides the implementation algorithm necessary to instantiate the MAC protocol.

It can be appreciated by one skilled in the art that the methods or processes described herein can be implemented as a program product, such as a control program residing with a computer memory and containing instructions that when executed on a CPU, will carry out the operations of the present invention. It is important to note that, while the present invention can be described in the context of a fully functional computer system, those skilled in the art can appreciate that the present invention is capable of being distributed as a program product in a variety of forms, and that the present invention applies equally, regardless of the particular type of signal-bearing media utilized to actually carry out the distribution. Examples of signal-bearing media include: recordable-type media, such as floppy disks, hard-disk drives and CD ROMs, and transmission-type media, such as digital and analog communication links. In one embodiment, for example, the invention is a software implementation of a Bellcore protocol.

Until required by the microcomputer, the set of instructions may be stored as a computer-program product in another computer memory, for example, in a disk drive attached to the microcomputer (which may include a removable memory such as an optical disk or floppy disk for eventual use in the disk drive).

Further, the computer-program product can also be stored at another computer and transmitted when desired to the user's workstation by a network or by an external network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

This invention may be implemented within any interactive multimedia satellite communication system and will be incorporated into emerging multimedia satellite air interface standards and incorporated into technical solutions being proposed to satellite network solutions customer.

In the preferred embodiment, the invention provides bandwidth on demand (BOD) medium access control (MAC) protocol for allocating resources to subscribers in a satellite based interactive multimedia communication system. Multimedia traffic is characterized by intermittent bursts at very high rate surrounded by periods of inactivity and a resulting low average rate. This MAC protocol takes advantage of knowledge of the traffic characteristics to improve system performance in terms of delay and channel efficiency relative to existing MAC protocols.

In the preferred embodiment, the MAC protocol addresses a system characterized by a large subscriber population sharing satellite resources using multi-frequency time division multiple access (MF-TDMA). Each TDMA channel is divided into slots, most of which are designated to carry subscriber traffic. The MAC protocol is responsible for assigning these slots to subscribers as needed.

Typically, only a small percentage of the subscribers have a session established at any given time. Further, during a session, the average transmission rate of a subscriber is a small fraction of a TDMA channel rate. In one illustrative embodiment, for example, a system consists of 100,000 subscribers sharing 100 MF-TDMA channels. Assuming that 5% (5,000) have a session in progress, this gives an average of 50 subscribers per TDMA channel. Also, for the purpose of this illustration, it is assumed that each of these subscribers has an average transmission rate which is 1% of the channel rate and that the traffic is very sporadic.

Figure 2:
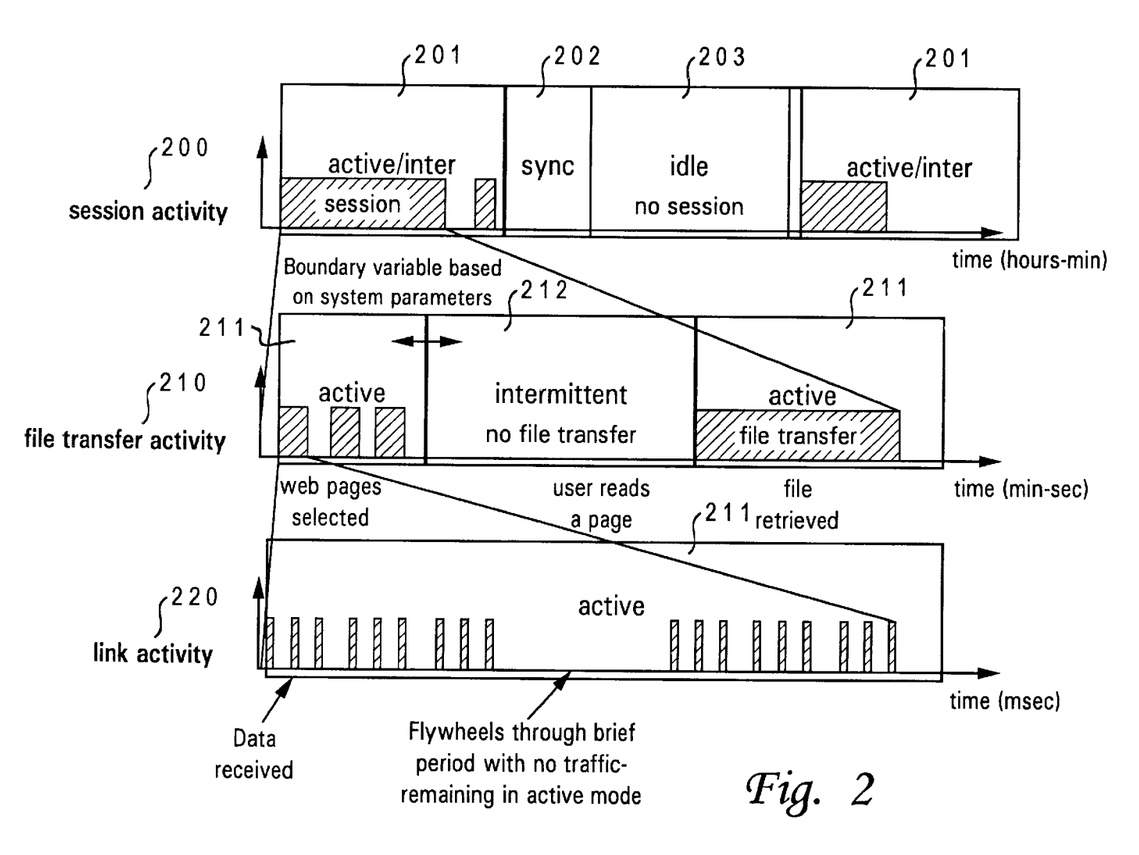
FIG. 2 is a diagram depicting various activity states according to one embodiment of the present invention.

FIG. 2 illustrates three levels of activity for a single user on a LAN and the burstiness inherent in the resource requirement. A session activity 200 generally last from several minutes to several hours. During this time, session activity 200 includes a plurality of changing terminal states. These states include active/intermittent 201, synchronized 202 or idle 203. Active/intermittent 201 represent periods when there is a session. Idle 203 represents periods when there is no session.

File transfer activity 210 involves a closer look of the active/intermittent state 201 in session activity 200. The time frame in question ranges from several minutes to seconds. The boundary variables are based on system parameters. File transfer activity 210 includes active state 211 and intermittent state 212. Active state 211 refers to periods when there is a file transfer (or data transfer). No file transfer occurs during intermittent state 212. As shown in file transfer activity 210, both the length of the bursts and the time between bursts vary in an unpredictable manner.

Link activity 220 breaks down the active state 211 further to show the inherent choppiness in the data transfer. The time frame is milliseconds. There is no change in resources allocated during the brief silent segments of the active period.

In the preferred embodiment, the Activity Based Resource Assignments MAC protocol is designed to adapt: the resource reservation process to the terminal activity in an effort to increase or maximize the efficiency and minimize the delay. In effect, it captures the functionality of both a circuit switched protocol for steady traffic and a burst-by-burst protocol for bursty traffic.

The fundamental concept of the Activity Based Resource Assignment MAC protocol is to allocate active users as much resources as they need for as long as they remain active subject to resource availability. In essence, a channel is assigned to a subscriber, and the size of the channel is adjusted based on his activity. An active subscriber may have from as few as one slot per TDMA frame to as many as every slot in the frame. As long as the subscriber remains active, requests for additional resources, or alternately, reports of queue size or delay can be piggybacked with the data traffic. Thus, active subscribers do not have to use the contention based request channels. This feature eliminates a significant amount of the signaling overhead and delay.

Figure 3:
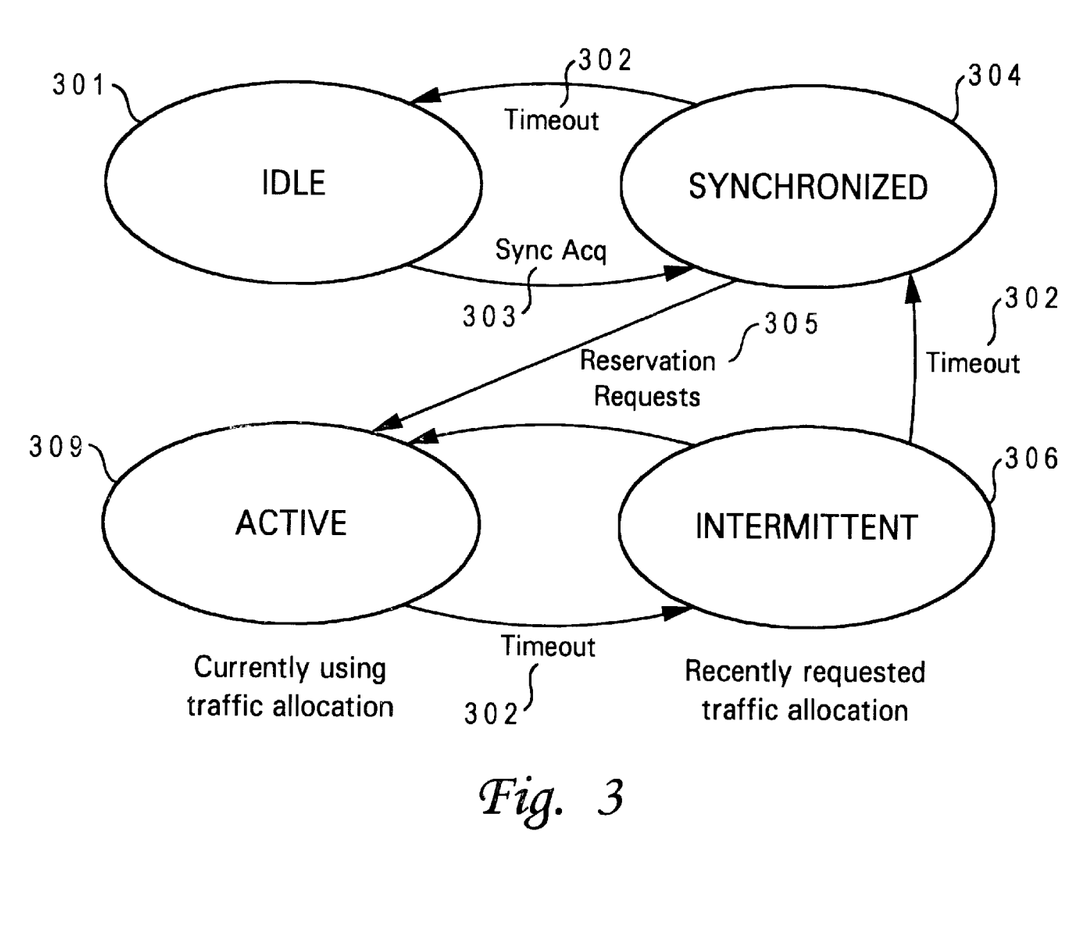
FIG. 3 is a diagram depicting the transition among terminal states according to one embodiment of the present invention.

This control concept is illustrated in FIG. 3. Subscribers transition among four terminal states based on level of activity. These states are Idle 301, Synchronized 304, Intermittent 306 and Active 309 and are defined as follows:

Idle terminals 301 are not currently sending any traffic and have not recently sent any traffic;

Synchronized terminals 304 have time and frequency synchronization for the reverse channel. This potentially requires infrequent exchanges of signaling with the controller. Depending on the resources required to maintain a terminal in the synchronized state, a terminal may transition from idle to synchronized via a sync acq 303 message when powered on or it may wait until the terminal needs to access the system;

Intermittent terminals 306 have a session in progress, but have not transmitted for a predetermined period of time. A terminal in the Intermittent state is assigned capacity only for reservation requests without contention. The dedicated reservation channel minimizes the delay involved for the intermittent terminal to return to the active state; and Active terminals 309 have a session in progress and are either currently sending data or have sent data within a predetermined period. An active terminal has some number of reserved data slots in the current frame. The active state is divided into a number of substates corresponding to the current traffic needs of the terminal. Transitions among these substates is accomplished by reservation requests 305 or buffer size messages embedded in the terminals data stream. The timeout periods 302 which cause the transition from Active 309 to Intermittent 306 and then from Intermittent 306 to Idle 301 are system variables which can be adjusted according to system loading.

The amount of the total system capacity necessary for control and maintenance and the delay performance for reservation response are closely tied to the amount of resources that are dedicated to terminals in each of the three states with some activity.

In economic terms, Idle terminals are not sending any traffic and are not generating any revenue. Idle terminals are also likely to be the largest segment of the user population. It is very desirable to minimize the resources allocated to an idle terminal. In the Idle state of the preferred embodiment, terminals monitor a broadcast forward channel to receive paging messages and also to maintain system time to some degree of accuracy, although not necessarily to the level of accuracy needed for transmission. The amount of forward channel signaling capacity required for synchronization is independent of the number of terminals listening and is small in comparison with the amount of signaling required to support active users.

Ideally, terminals without current or recent data traffic needs are given no dedicated transmit resources. Because the ratio of these terminals to Intermittent and Active terminal is high, even a small allocation per terminal could result in a significant amount of traffic. Conversely, it may be necessary to allocate some small amount of transmit resources to these terminals in order to satisfy access delay requirements. For this reason, in the preferred embodiment, two states have been created for these terminals. The conditions for transition between Idle and Synchronized are established as a trade between the synchronization resource requirement and the access delay. These trades are explained in Table 1 below.

TABLE 1

Idle/Synchronized Terminal Resources

| Approach | Resource Implications | Delay Implications | Control Implications |
|---|---|---|---|
| Listen only | Least resources though number of contention channels may be larger | Greatest delays | Must acquire timing, frequency, power. May need to be authenticated. Then will request resources |
| Minimal keep alive reverse channel messaging | Infrequent reverse channel slots - perhaps once a minute - required to maintain synchronization. Requests handled via contention channel | less delay than listen only approach | Timing, frequency, power maintained. However, authentication may be required for any resource request. Resources requested in contention channel rather than waiting until next keep alive slot. |

Figure 4:
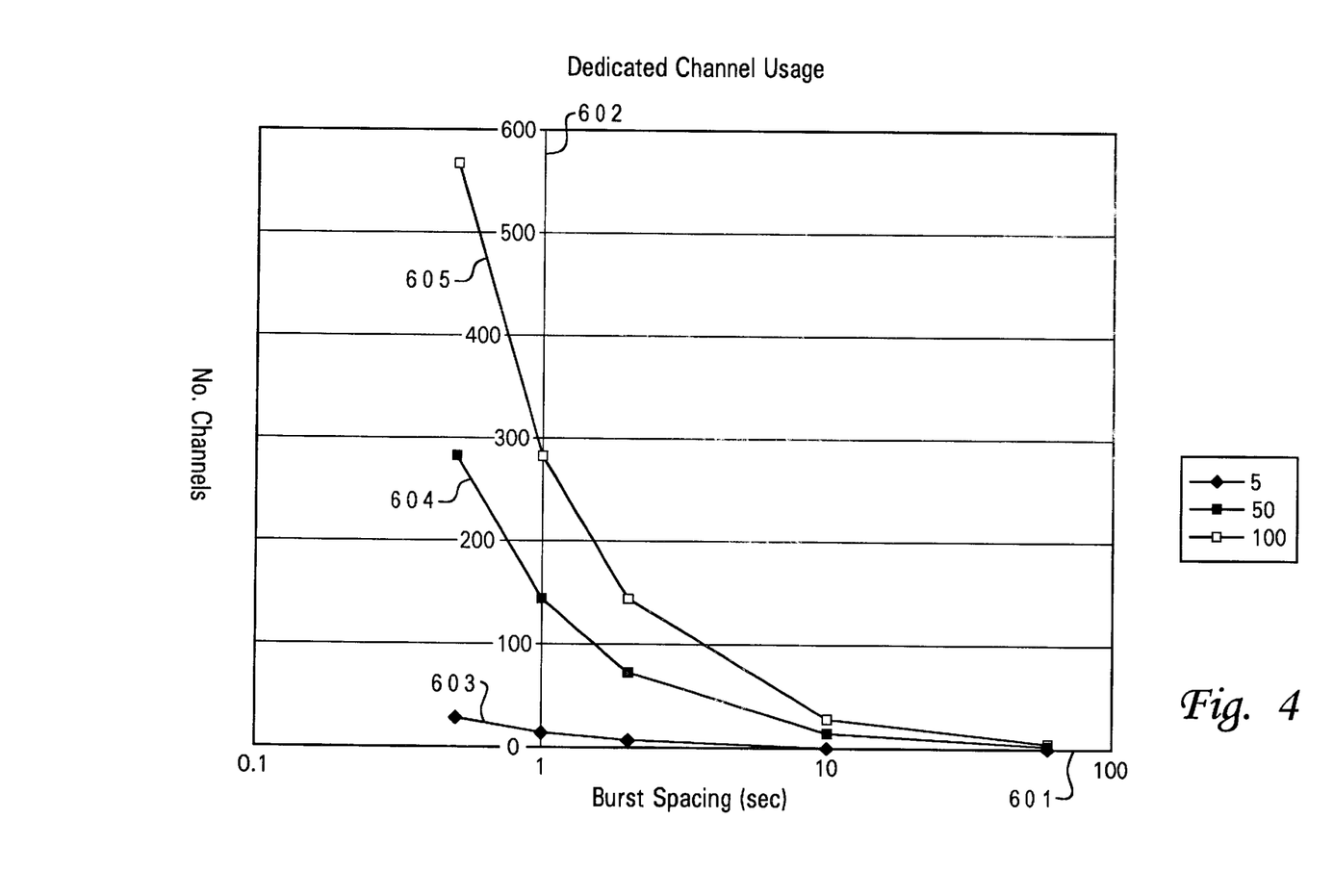
FIG. 4 is a graph depicting the dedicated channel usage according to one embodiment of the present invention.

FIG. 4 shows the reverse channel resources required for terminals to have some amount of dedicated slots. In accordance with the illustrative example, the system has 100,000 terminals. The combination of packet size and TDMA burst rate is such that there are 353 bursts per second. The 'X' axis 601 indicates the time between slots allocated to a single terminal and the 'Y' axis 602 is the number of channels that would need to be assigned just to support the dedicated slots of the terminals. The lower bound on the spacing is related to the round trip and processing delay (a terminal must not send a second request before the system can respond to the first). The four (4) data points on each curve are at 0.5, 1, 2, 10 and 60 second intervals between bursts. The three curves correspond to 5% 603, 50% 604 and 100% 605 of the 100,000 terminals having dedicated slots. Continuing with the example of 100,000 terminals sharing 100 channels, FIG. 4 show the high price in system resources that would be spent to give dedicated slots to all terminals.

These curves show the required reverse channel resources for various synchronization maintenance approaches. If the interval between synchronization bursts can be made very long, then all of the terminals could be supported in the Synchronized state. As an illustrative example, five channels are required for 100% of the users to have a dedicated slot every 60 seconds. This being the case, the system could have terminals transition from the Idle to the Synchronized state at power on.

Conversely, if the synchronization requirements demand a shorter interval between synchronization bursts, the system cannot support all of the terminals in the Synchronized state. The system only has 100 channels, but 142 would be required to give every terminal a slot every 2 seconds. Alternately, five channels could support 3% of all terminals in the Synchronized state with a 2 second interval between slots. In this case, the system would require terminals to remain in the Idle state until a data channel was required. Since there are more terminals than synchronization slots, the initial synchronization bursts from the terminal are sent in channels shared among all users and governed by a contention protocol.

From the preceding discussion, a terminal may be in either the Idle or Synchronized state when it first needs to request a traffic channel. In the first case, with dedicated synchronization slots, it may be possible to piggy-back traffic channel requests with the synchronization bursts. However, from resource considerations, the interval between these bursts may be very long and so piggy-backing requests could introduce significant delay. To avoid the this, a contention based resource request channel is utilized in the preferred embodiment. In the second case, the terminal must obtain synchronization using a contention channel before making resource requests. In either case, the terminals must tolerate the delay associated with a contention access for the initial service request. Once the Synchronized terminal has been granted the initial resource allocation, it enters the Active state, and future reservations are imbedded in the transmit stream.

The system can afford to dedicate some resources to Intermittent terminals for reservation requests since it is expected that only a small percentage of the terminals will be in the Intermittent state. Consider the 5% 403 curve with an interval of 0.5 to 1 second between bursts in FIG. 4.

For each system traffic characterization and system loading, a timeout period can be established based on trades between the amount of dedicated reservation resources required to keep a terminal in the Intermittent state verses the increased access delay associated with contention access in the Synchronized state.

In the preferred embodiment, terminals in the Active state have a session in progress, have dedicated slots in the TDMA channel, and are either currently sending or have recently sent traffic bursts. To enter the Active state in the preferred embodiment, the terminal either makes a resource request in a contention channel and transitions from the Synchronized state, or it makes a resource request in its dedicated reservation request channel and transitions from the Intermittent state. An Active terminal has some number of slots in each frame giving it an effective circuit rate. The maximum circuit rate is the TDMA channel rate and is achieved when all of the slots in the frame are assigned to a single Active terminal. Assuming that there are N slots per frame and that the active terminal is assigned a single slot per frame, the minimum circuit rate is 1/N times the TDMA channel rate.

In the preferred embodiment, the circuit assignment will remain in effect for as long as the Active terminal needs it. If the Active terminal traffic requirement drops, the circuit rate will be adjusted to match this new need. In systems of the preferred embodiment in which the resource controller can monitor the channel activity in real time, it can decide based on current system loading and the Active terminal's activity to lower the circuit rate. Alternately, an agent at the terminal may report channel utilization once it reaches a predefined threshold. Similarly, if the Active terminal traffic requirement increases, the circuit rate will be increased to match the new need in the preferred embodiment. In this case, the resource controller would only see that an Active terminal was using all of its allocated slots if it only monitored the channel activity. In the preferred embodiment, a faster response would be obtained using an agent at the terminal to report above threshold delay or queuing size to the controller and allow the resource controller to adjust the channel. In each of these cases, signaling is only required when a change in resources is needed. This approach has the low signaling overhead that is associated with circuit switching, while simultaneously providing resources matched to traffic load and the associated benefits of low delay and high resource utilization.

Figure 5:
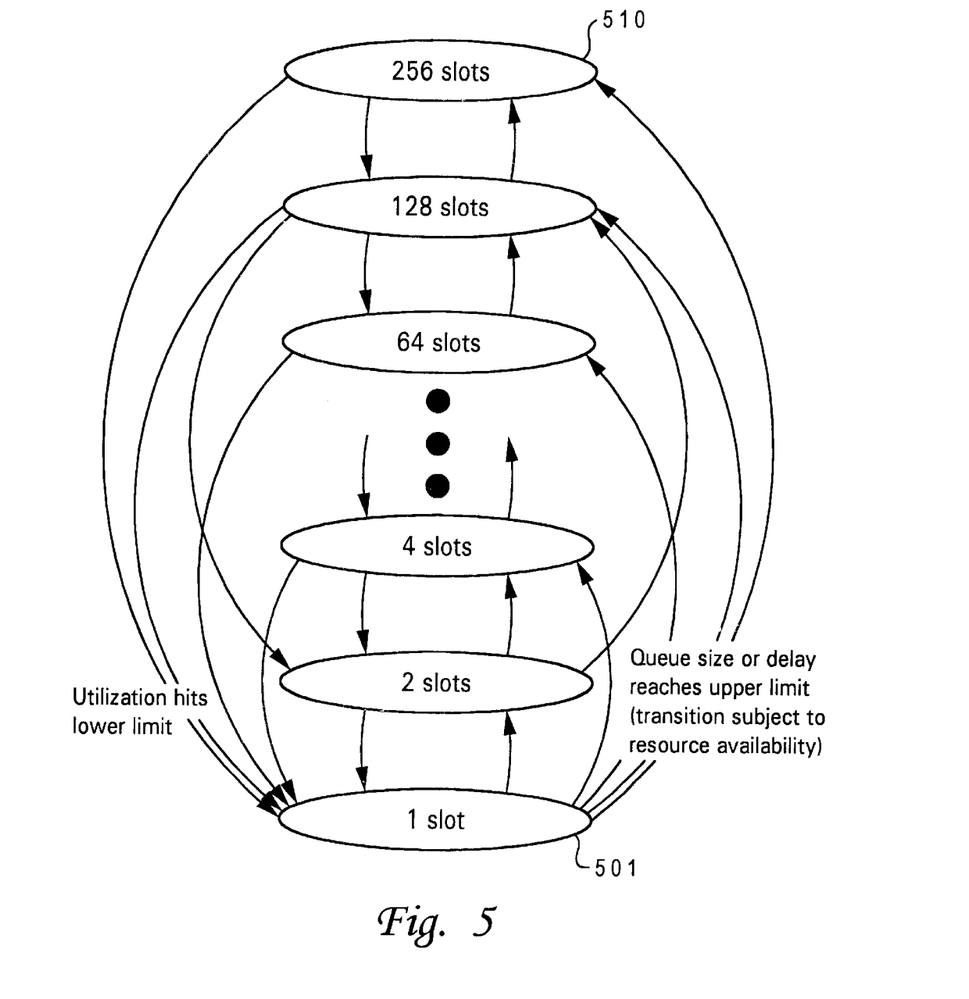
FIG. 5 is a diagram depicting slot allocation for terminals in accordance with one embodiment of the present invention.

Within the Active state, the assignment of a specific number of TDMA slots can be considered a sub-state in one embodiment of the invention. A potential selection of these sub-state rates and the transitions among them is shown in FIG. 5. This diagram implies that there are 256 slots 510 per frame, that there can be as few as one slot 501 per frame, and that the assignable circuit increase in powers of 2 from 1/256 times the TDMA channel rate up to the full TDMA channel rate. While it is expected that the transition from the Active state to Intermittent would only occur from the 1 slot per frame sub-state, it is possible that a terminal could transition from Idle to any of the Active substates.

The Activity Based Resource Assignment Protocol is equally applicable to systems with more or fewer Active substates. However, in the preferred embodiment, the selection of substates shown in FIG. 5, based on logarithmic scale, could simplify resource management and also reduce the message size necessary to identify a resource allocation. The resource controller will modify the resources allocated to a terminal taking into account the system and user activity. Among the criteria the resource controller may use are:

i. number and size of outstanding resource requests;

ii. recent utilization of existing channel by the terminal;

iii. number of users currently in each state;

iv. delay reported from the terminal;

v. buffer size reported from the terminal; and vi terminal priority.

The labels in FIG. 5 show some of the possible triggers for state transitions. The general case shown in the figure allows direct transitions between any of the Active substates. Constraining the size and frequency of the sub-state changes may improve the overall efficiency and delay performance. In the preferred embodiment, a lightly loaded system benefits from a generous allocation algorithm which allows large positive changes in resources, but which decreases the resource allocation slowly by transitioning only between adjacent states. Each terminal is assigned more resources than needed, but since the system is lightly loaded, the inefficiency is not a concern. The delay performance is improved with the higher resource allocation both for the initial burst which generates the large jump in allocated resources, and then for subsequent bursts since the assigned resources are removed more slowly. Similar reasoning implies that a heavily loaded system would benefit from a stingy allocation algorithm which only allows increases in resources by transitions to the next higher sub-state, but which takes away resources with large negative transition in the preferred embodiment.

While the invention has been particularly shown and described with reference to a preferred embodiment, it will be understood by those skilled in the art that various changes in form and detail may be made therein without departing from the spirit and scope of the invention. For example, although the invention has been shown with a particular number of states, it is understood by those skilled in the art that this does not preclude a higher or lower number of states.

What is claimed is:

1. A method for implementing an activity based resource assignment medium access control (MAC) protocol to allocate resources to subscribers in an interactive, multimedia, broadband satellite communications system, said method comprising:

providing a plurality of channels;

assigning at least one of said plurality of channels to each of a plurality of terminals wherein said assigning step includes: (1) sharing a pool of satellite transmission resources among large numbers of multimedia terminals; (2) exploiting traffic characteristics of individual interactive satellite terminal users, wherein said characteristics include intermittent bursts of high activity followed by long periods of no activity; and (3) reducing access delay within the communication system;

monitoring utilization of channel resources by said plurality of terminals;

evaluating system needs based on levels of activity of said plurality of terminals and utilization of channel resources by said plurality of terminals;

communicating to a resource controller information on said system needs and requests for system resources by said plurality of terminals;

calculating system needs utilizing said resource controller; and utilizing said resource controller, adjusting resources allocated to individual channels of said plurality of channels based on said system needs, wherein said adjusting provides active terminals with required resources when said terminals are active, subject to resource availability.

2. The method of claim 1, wherein said MAC protocol utilizes media satellite air interface standards and further wherein said MAC protocol is implemented utilizing software algorithm within the communication system processors.

3. The method of claim 1, wherein said MAC protocol is a multimedia circuit switch MAC protocol tailored to satellite environment with characteristics which promote high resource efficiency and low delay and further wherein said MAC protocol is a bandwidth on demand (BOD) MAC protocol.

4. The method of claim 1, wherein said monitoring step further includes the steps of:

establishing a set of operational parameters for optimal channel utilization;

gathering information on channel activity in real time utilizing a resource controller;

comparing said information on the channel activity with said operational parameter; and adjusting the rate of data traffic based on a comparison of system and individual terminal activity against said operational parameter.

5. The method of claim 1, wherein said communicating step further includes the step of attaching to the data traffic requests for additional resources and reports of queue size and delay.

6. The method of claim 1, wherein said adjusting step further includes the steps of:

increasing channel resources during periods of high activity and bursty traffic when system activity demands it; and decreasing channel resources during periods of inactivity and periods of low traffic when system activity demands it.

7. The method of claim 1, wherein said adjusting step further includes the steps of:

instantiating an adjustment in channel resources in response to lightly loaded systems utilizing a generous allocation algorithm which has large positive charges in resources and slow decrease in resources allocation between adjacent states; and instantiating an adjustment in channel resources in response to heavily loaded systems utilizing a stingy allocation algorithm which implements increases only to the next higher sub-state and large negative decreased.

8. The method of claim 1, wherein said adjusting step further includes the step of modifying resources allocated to a terminal based on a plurality of system criteria including:

(i) number and size of outstanding resource requests;
(ii) recent utilization of existing channel by the terminal;
(iii) number of users currently in each state;
(iv) delay reported from the terminal;
(v) size reported from the terminal; and
(vi) terminal priority.

9. The method of claim 1, wherein said broadband interactive satellite communications system includes geostationary satellite communication systems.

10. A system for implementing an activity based resource assignment medium access control (MAC) protocol to allocate resources to subscribers in an interactive, multimedia, broadband satellite communications system comprising:

means for providing a plurality of channels;

means for assigning at least one of said plurality of channels to each of a plurality of terminals, wherein said assigning means includes: (1) means for sharing a pool of satellite transmission resources among large numbers of multimedia terminals; (2) means for exploiting traffic characteristics of individual interactive satellite terminal users, wherein said characteristics include intermittent bursts of high activity followed by long periods of no activity; and (3) means for reducing access delay within the communication system;

means for monitoring utilization of channel resources by said plurality of terminals;

means for evaluating system needs based on levels of activity of said plurality of terminals and utilization of channel resources by said plurality of terminals;

means for communicating to a resource controller information on said system needs and requests for system resources by said plurality of terminals;

means for calculating system needs utilizing said resources controller; and means for utilizing said resource controller, adjusting resources allocated to individual channels of said plurality of channels based on said system needs, wherein said adjusting provides active terminals with required resources when said terminals are active, subject to resource availability.

11. The system of claim 10, wherein said MAC protocol utilizes media satellite air interface standards and further wherein said MAC protocol is implemented utilizing software algorithm within the communication system processors.

12. The system of claim 10, wherein said MAC protocol is a multimedia circuit switch MAC protocol tailored to satellite environment with characteristics which promote high resource efficiency and low delay and further wherein said MAC protocol is a bandwidth on demand (BOD) MAC protocol.

13. The system of claim 12, said communicating means further includes:
   means for attaching to the data traffic requests for additional resources and reports of queue size and delay; and
   means for notifying the resource controller when an active terminal is using all of its allocated slots.

14. The system of claim 10, said monitoring means further includes:
   means for establishing of operational parameters for optimal channel utilization;
   means for gathering information on the channel activity in real time utilizing a resource controller;
   means for comparing said information on the channel activity with said operational parameter; and
   means for adjusting the rate of data traffic based on a comparison of system and individual terminal activity against said operational parameters.

15. The system of claim 10, wherein said adjusting means further includes:
   means for increasing channel resources during periods of high activity and bursty traffic when system activity demands it; and
   means for decreasing channel resources during periods of inactivity and periods of low traffic when system activity demands it.

16. The system of claim 10, wherein said adjusting means further includes:
   means for instantiating an adjustment in channel resources in response to lightly loaded systems utilizing a generous allocation algorithm which has large positive charges in resources and slow decrease in resources allocation between adjacent states; and
   means for instantiating an adjustment in channel resources in response to heavily loaded systems utilizing a stingy allocation algorithm which implements increases only to the next higher sub-state and large negative decreased.

17. The system of claim 10, wherein said adjusting means further includes means for modifying resources allocated to a terminal based on a plurality of system criteria including:
   (i) number and size of outstanding resource requests;
   (ii) recent utilization of existing channel by the terminal;
   (iii) number of users currently in each state;
   (iv) delay reported from the terminal;
   (v) size reported from the terminal; and
   (vi) terminal priority.

18. The system of claim 10, wherein said broadband interactive satellite communications system includes geostationary satellite communication systems.

19. A computer program product for implementing an activity based resource assignment medium access control (MAC) protocol to allocate resources to subscribers in an interactive, multimedia, broadband satellite communications system comprising of program instructions in a computer readable medium for:
   providing a plurality of channels;
   assigning at least one of said plurality of channels to each of a plurality of terminals, wherein said assigning instructions include instructions for: (1) sharing a pool of satellite transmission resources among large numbers of multimedia terminals; (2) exploiting traffic characteristics of individual interactive satellite terminal users, wherein said characteristics include intermittent bursts of high activity followed by long periods of no activity; and (3) reducing access delay within the communication system;
   monitoring utilization of channel resources by said plurality of terminals;
   evaluating system needs based on levels of activity of said plurality of terminals and utilization of channel resources by said plurality of terminals;
   communicating to a resource controller information on said system needs and requests for system resources by said plurality of terminals;
   calculating system needs utilizing said resources controller; and
   utilizing said resources controller, adjusting resources allocated to individual channels of said plurality of channels based on said system needs, wherein said adjusting provides active terminals with required resources when said terminals are active, subject resource availability.

20. The computer program product of claim 19, wherein said MAC protocol utilizes media satellite air interface standards and further wherein said MAC protocol is implemented utilizing software algorithm within the communication system processors.

21. The computer program product of claim 19, wherein said MAC protocol is a multimedia circuit switch MAC protocol tailored to satellite environment with characteristics which promote high resource efficiency and low delay and further wherein said MAC protocol is a bandwidth on demand (BOD) MAC protocol.

22. The computer program product of claim 19, said program instructions for said monitoring step further include program instructions for:
   establishing of operational parameters for optimal channel utilization;
   gathering information on channel activity in real time utilizing a resource controller;
   comparing said information on the channel activity with said operational parameter; and
   adjusting the rate of data traffic based on a comparison of system and individual terminal activity against said operational parameters.

23. The computer program product of claim 19, said program instructions for said communicating step further include program instructions for:
   attaching to the data traffic requests for additional resources and reports of queue size and delay; and
   notifying the resource controller when an active terminal is using all of its allocated slots.

24. The computer program product of claim 19, wherein said program instructions for said adjusting step further include program instructions for:
   increasing channel resources during periods of high activity and bursty traffic when system activity demands it; and
   decreasing channel resources during periods of inactivity and periods of low traffic when system activity demands it.

25. The computer program product of claim 19, wherein said program instructions for said adjusting step further include program instructions for:
   instantiating an adjustment in channel resources in response to lightly loaded systems utilizing a generous allocation algorithm which has large positive charges in resources and slow decrease in resources allocation between adjacent states; and instantiating an adjustment in channel resources in response to heavily loaded systems utilizing a stingy allocation algorithm which implements increases only to the next higher sub-state and large negative decreased.

26. The computer program product of claim 19, wherein said program instructions for said adjusting step further include program instructions for modifying resources allocated to a terminal based on a plurality of system criteria including:

(i) number and size of outstanding resource requests;

(ii) recent utilization of existing channel by the terminal;

(iii) number of users currently in each state;

(iv) delay reported from the terminal;

(v) size reported from the terminal; and (vi) terminal priority.

27. The computer program product of claim 19, wherein said broadband interactive satellite communications system includes geostationary satellite communication systems.

* * * * *